United States Patent
Spiegelaar et al.

[11] Patent Number: 5,807,123
[45] Date of Patent: Sep. 15, 1998

[54] RADIO-TELEPHONE CRADLE CONNECTOR

[75] Inventors: Hans Spiegelaar, TX Delft, Netherlands; Eric Van Der Heyden, Harrisburg, Pa.; Jacobus Nicolaas Tuin, CW Best, Netherlands

[73] Assignee: The Whitaker Corporation, Wilmington, Del.

[21] Appl. No.: 809,921

[22] PCT Filed: Oct. 17, 1995

[86] PCT No.: PCT/IB95/00883

§ 371 Date: Jun. 30, 1997

§ 102(e) Date: Jun. 30, 1997

[87] PCT Pub. No.: WO96/13926

PCT Pub. Date: May 9, 1996

[30] Foreign Application Priority Data

Oct. 27, 1994 [GB] United Kingdom .................. 9421663

[51] Int. Cl.$^6$ ............................................... H01R 29/00
[52] U.S. Cl. ........................... 439/188; 439/78; 439/136
[58] Field of Search ................................. 439/188, 71, 78, 439/92, 382, 718, 135–137

[56] References Cited

U.S. PATENT DOCUMENTS

| | | | |
|---|---|---|---|
| 3,894,203 | 7/1975 | Diehr | 200/6 R |
| 4,734,051 | 3/1988 | Burns | 439/289 |
| 4,778,404 | 10/1988 | Pass | 439/387 |
| 4,954,087 | 9/1990 | Lauks et al. | 439/71 |

FOREIGN PATENT DOCUMENTS

| | | |
|---|---|---|
| 0 718 918-A1 | 6/1996 | European Pat. Off. . |
| 0 718 919-A1 | 6/1996 | European Pat. Off. . |
| 1009549 | 5/1952 | France . |
| 43 19 756 | 12/1994 | Germany . |
| 2 143 679 | 2/1985 | United Kingdom . |
| WO 94/11925 | 5/1994 | WIPO . |

*Primary Examiner*—Khiem Nguyen
*Attorney, Agent, or Firm*—Driscoll A. Nina

[57] ABSTRACT

A cradle connector for a radio-telephone base station has a plurality of terminals mounted in insulative housings the terminal interconnected by a shorting bar inmoulded to the housing. The terminals have spring section and contacts that are depressible against action of the spring to allow relatively large tolerances in the positioning of the telephone with respect to the base station. The contacts have extensions that abut against the shorting bar when the connector is disconnected, whereby one of the terminals is connected to ground so that electrostatic discharges do not damage the base station circuitry. Certain extensions can be removed for some of the terminals if such terminals should not be grounded (e.g. power terminals). The shorting bar could be made of wire that interconnects a plurality of housings during manufacturing and handling for reducing the cost thereof. The cradle connector is thus compact, cost-effective and protected against electrostatic discharge.

16 Claims, 2 Drawing Sheets

RADIO-TELEPHONE CRADLE CONNECTOR

BACKGROUND OF THE INVENTION

1. Field of the Invention

This invention relates to a connector for interconnecting a radio-telephone to its base station for signal and power transmission, with a means for preventing electrostatic discharge from damaging the base station circuitry.

2. Summary of the Prior Art

It is common to find radio-telephones with a plurality of planar contact faces disposed in a row along a bottom surface of the radio-telephone, for interconnection to power and signal contacts whilst the telephone is positioned on a cradle on the base station. This electrical connection provides not only electrical power for recharging the radio-telephone batteries, but also signals for controlling and communicating with the telephone whilst the telephone is on the base station. As the telephone needs to be removed and replaced from its cradle, the cradle connector (i.e. the connector positioned in the base station for connection to the contacts of the radio-telephone) needs to allow for a relatively large variation in tolerance in the positioning of the radio-telephone contacts in relation to the size of the connector.

Due to the frequent removal and repositioning of the radio-telephone on its cradle, there is a need for a reliable connection over the life of the telephone whilst adjusting to the large tolerances in positioning. There is also a need to protect the circuitry of the base station, in particular from electrostatic discharges that could occur between an external device, or between the contacts of the cradle connector when exposed to the environment as is the case when the telephone is removed. There is of course a continuous demand on provision of a more compact and cost-effective connection system.

SUMMARY OF THE INVENTION

It is therefore an object of this invention to provide a cradle connector that can adjust to a relatively large tolerance in the positioning of the complementary contacts, in a compact, cost-effective and reliable manner.

It is another object of this invention to provide a cradle connector that is protected from electrostatic discharge in a cost-effective, compact and reliable manner.

The objects of this invention have been achieved by providing a cradle connector having a connection end for electrical connection to electronic circuitry of a base station, and a contact end for connection to a removable device, wherein supple spring means are provided between the connection end and the contact end, wherein two or more contacts of the connector are provided with extensions proximate the contact for abutting against a short circuiting bar positioned within the connector. In an embodiment of this invention, the short circuiting bar is integrally moulded to a housing of the connector and positioned proximate a top wall of the housing proximate the contacts. The short circuiting bar could be in the shape of a wire interconnecting a plurality of cradle connectors during manufacturing for cost-effective transportation and handling thereof. The shorting bar could be earthed by connecting one of the contacts to grounding circuitry of the base station.

DETAILED DESCRIPTION OF THE PREFERRED EMBODIMENT

Figure 1:
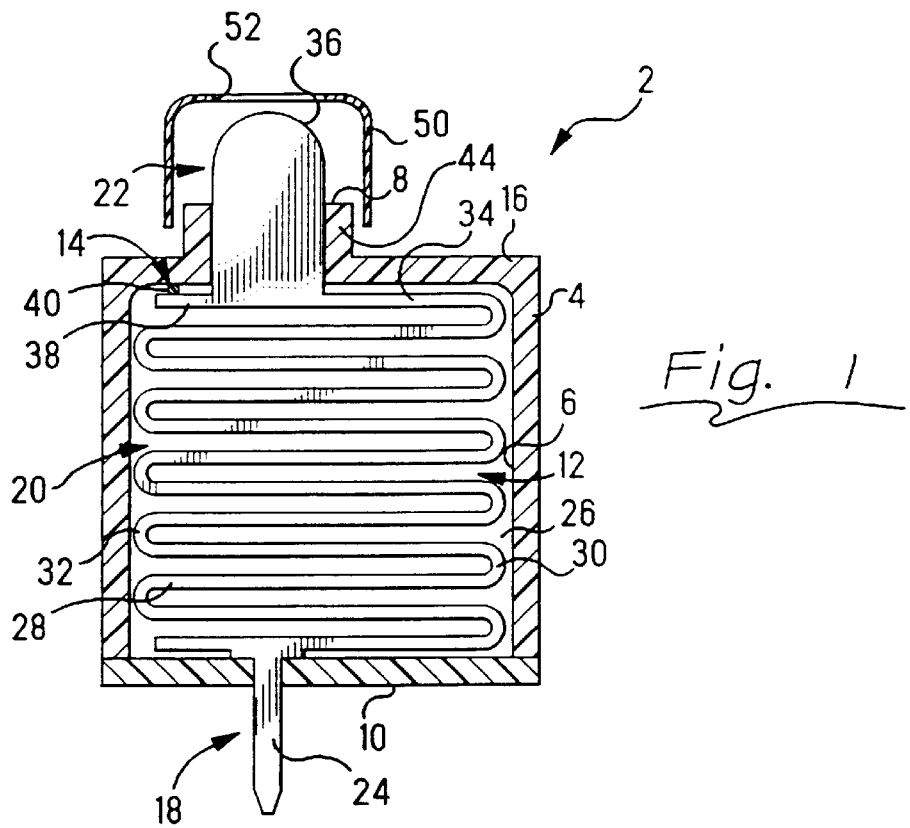
FIG. 1 is a cross-sectional view through a cradle connector.
Figure 3:
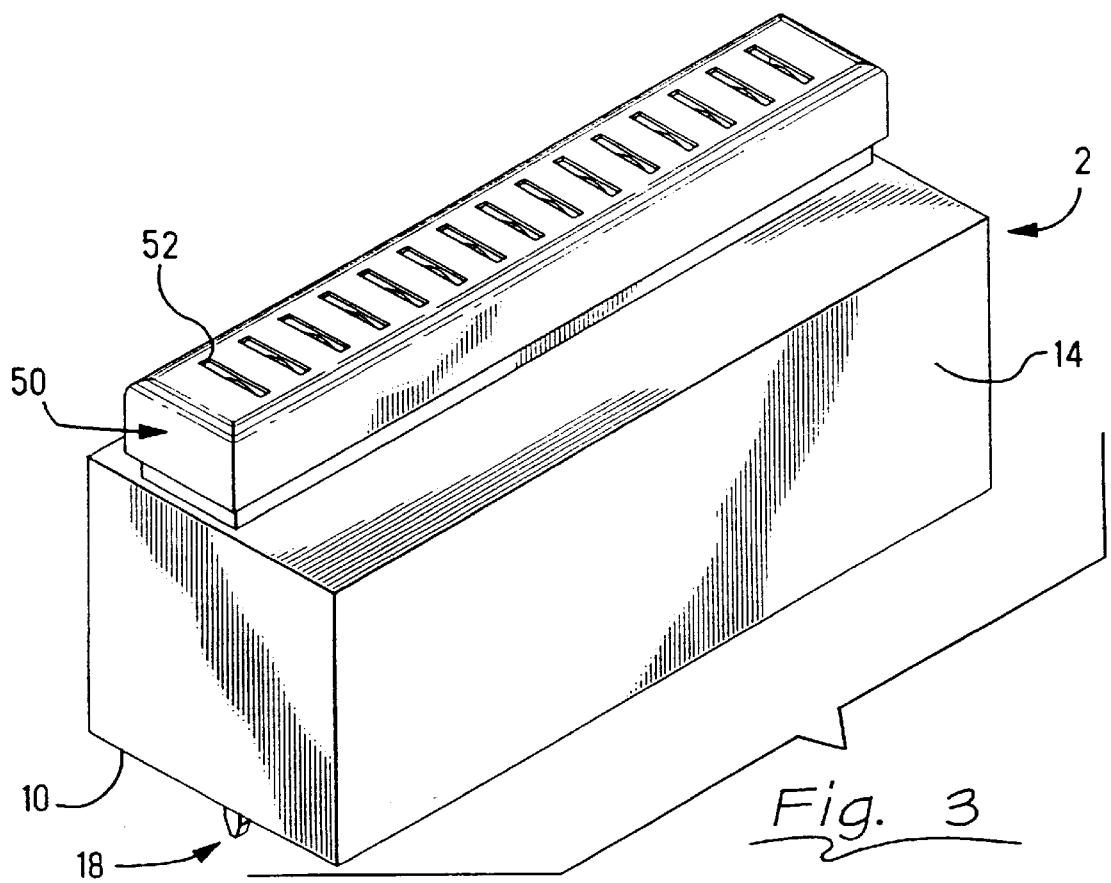
FIG. 3 is an isometric view of a cradle connector.

Referring to FIG. 1, an electrical cradle connector 2 is shown comprising an insulative housing 4 having terminal receiving cavities 6 extending from a mating end 8 to a printed circuit board mounting end 10, and terminals 12 mounted in the cavities 6. The connector 2 also comprises a shorting bar 14 positioned against a top wall 16 of the housing 4.

The contact 12 comprises a connection section 18, a spring section 20, and a contact section 22. The connection section 18 comprises a printed circuit board mounting post 24 projecting below the mounting surface 10 for insertion into plated through holes of a printed circuit board. The connection section 18 could however also be provided with other connection means for interconnection to a complementary connector, terminals of a printed circuit board, or other device. The terminal 12 is edge-stamped from sheet metal and is therefore substantially planar, and therefore mountable in a compact juxtaposed manner with other contacts of the connector 2. The terminal receiving cavities 6 have side walls 26 between adjacent cavities 6, which also provide a lateral guide for the contact spring section 20. The contact spring section 20 comprises spring beams 28 attached at opposite ends to alternate U-bends 30,32 interconnecting the spring beams 28 in a meandering arrangement.

An upper end 34 of the spring section 20 is attached to the contact section 22 which comprises an arcuate, convex contact surface 36 protruding beyond the housing mating surface 8 when the contact section 22 is in its uppermost position. The contact surface 36 has a substantially circular contour over 180°. An extension 38 projects from the contact section 22 on an opposing side of the contact section with respect to the upper end 34 of the spring section 20, the extension 38 butting against the shorting bar 14 that extends transversely to the extension 38 of the plurality of terminals 12, when the contacts 22 are in the uppermost position.

The shorting bar 14 can be a conductive member such as a metallic wire that is overmoulded by the insulative housing 4 such that a portion 40 of the shorting bar 14 projects into the cavity 6 for electrical contact with the extension 38 when in the uppermost position.

Figure 2:
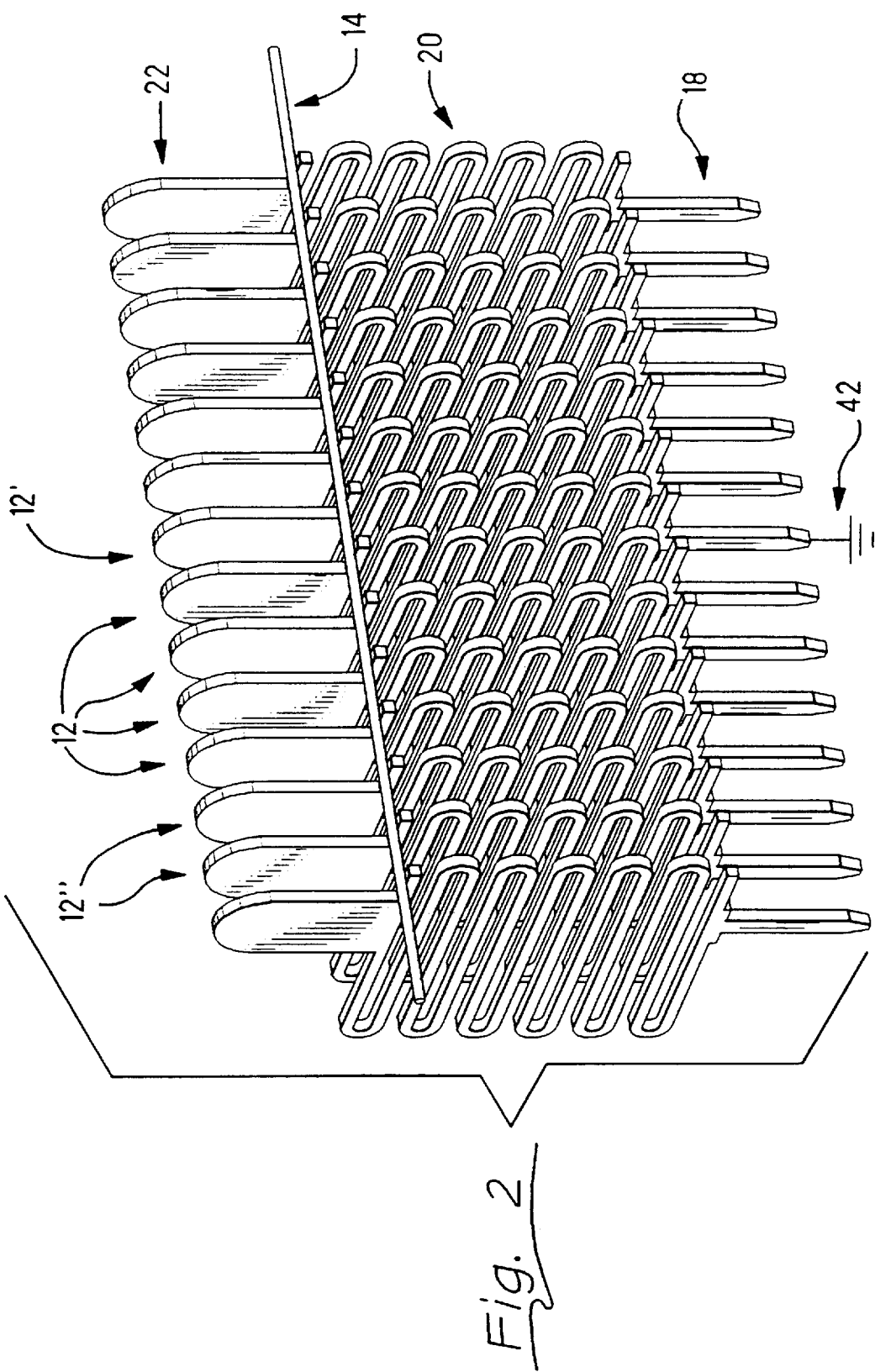
FIG. 2 is an isometric view of a plurality of contacts of the cradle connector, and a shorting bar.

Referring to FIG. 2, a plurality of terminals 2,12',12" of the cradle connector 2 are shown with the housing 4 of the connector removed. The shorting bar 14 electrically interconnects the plurality of terminals 12 with extensions 38, whereby one of the terminals 12' is connected to ground circuitry (schematically represented by the symbol 42) of a base station or device to which the connection section 18 is connected. The latter thus grounds all of the terminals 12 interconnected by the shorting bar 14. There may however be a desire not to short circuit some of the terminals 12" to ground, for example power contacts, this being achieved by eliminating the shorting extensions 38 of these terminals. The latter can be very easily done by simply shearing away the shorting extension 38 of these contacts during the stamping procedure.

A device such as a radio telephone for electrical connection to the cradle connector 2, may comprise substantially planar contact surfaces for engagement against the arcuate contact surfaces 36 of the terminals 12,12',12" whereby the contact surfaces of the device depress the contacts 22 in opposition to the resiliency of the spring section 20, such that the shorting extensions 38 are disconnected from the shorting bar 14. The radio-telephone may typically have not only a movement towards the cradle connector but also a rocking movement during connection for seating of the radio-telephone into its final blocked position on the base station to which the cradle connector 2 is securely mounted. The arcuate surfaces 36 over a large angle thus enables a large rotational movement of the complementary device contacts during interconnection. The meandering spring section and large number of spring beams 28 allow a large axial displacement of the contacts 22 such that large tolerances in positioning of the complementary device contacts with respect thereto, can be tolerated. The contacts 22 are guided effectively in the vertical direction by axial guide walls 44 of the housing 4 surrounding the contact section 22. The contact sections 22 can thus be depressed by an external object until such object abuts the mating end 8 of the axial guide walls 44 without overstressing or damaging the terminals.

The shorting bar 14 can be very cost-effectively produced by providing, for example, simple cylindrical wire whereby the shorting bar could also be used to interconnect a plurality of housings 4 which are overmoulded to the wire, the wire serving to hold the housings together during manufacturing and handling, the housing separable by shearing away the portion of shorting bar interconnecting adjacent housings during the desired assembly stage. The shorting bar could also be produced out of a strip of sheet metal, where pilot holes could be provided for improved ease of transportation.

A cap 50 can be positioned over the section of contacts 22 protruding beyond the housing 4 for protection thereof when the complementary device is removed. The cap is mounted with resilient means (not shown) to the housing 4 and depressible during connection of the complementary device (e.g. radio-telephone) in its cradle. The cap 50 is provided with slots 52 to allow passage of the contacts therethrough for connection to the device.

Advantageously therefore, electrostatic discharge damage of electronic circuitry interconnected to the cradle connector is avoided by provision of a simple and cost-effective shorting bar interconnecting terminals of a cradle connector when the complementary device such as a radio-telephone is removed and the cradle connector terminals exposed. The shorting bar can advantageously also provide a means for interconnecting a plurality of connector housings or connectors during manufacturing and handling for reducing such costs. The cradle connector is thus compact, cost-effective but nevertheless reliable.

We claim:

1. A cradle connector for interconnecting a frequently removable and replaceable telephone to a base station, the connector comprising an insulative housing having cavities therein, and terminals mountable within the cavities, the terminals comprising connection sections for electrical connection to electrical circuitry of the base station, contact sections for electrical connection to complementary contacts of the removable device, and supple meandering spring sections intermediate the contact and connection sections for allowing resilient biasing of the contact sections to compensate for relatively large tolerances in positioning of the device, wherein the cradle connector comprises a shorting bar electrically interconnecting the terminals when disconnected to the removable device.

2. The connector of claim 1 wherein the terminals comprise shorting extensions proximate the contact sections for electrical contact with the shorting bar.

3. The connector of claim 2 wherein the shorting extension extends from an opposing side of the contact section to the spring section.

4. The connector of claim 2 wherein one or more terminals of the connector are not electrically connectable to the shorting bar, the terminals being of substantially the same design as the shorted terminals except for the shorting extensions removed.

5. The connector of claim 1 wherein the spring section comprises a plurality of spring beams interconnected by U-bends in a meandering arrangement.

6. The connector of claim 1 wherein the contact section is guided in the direction of its resilient axial movement, by housing guide walls extending axially from a mating end of the housing, a mating end of the guide walls providing an abutment to prevent overstressing of the terminal spring sections.

7. The connector of claim 1 wherein the shorting bar is inmoulded to the housing.

8. The connector of claim 1 wherein the shorting bar is positioned transversely to shorting extensions of the terminals.

9. The connector of claim 8 wherein the shorting bar is a wire.

10. The connector of claim 8 wherein the shorting bar is a strip of stamped sheet metal with pilot holes for transportation.

11. The connector of claim 1 wherein one of the terminals is a ground terminal electrically connected to ground.

12. The connector of claim 10 wherein the shorting bar extends between a plurality of connectors during manufacturing and handling, and portions thereof are shearable from the housings to separate the connectors.

13. The connector of claim 1 wherein the shorting bar is positioned against a top housing wall proximate the mating end.

14. The connector of claim 1 wherein the terminal is a substantially planar edge stamped part.

15. The connector of claim 1 wherein the connector comprises a cap covering the contacts when the complementary device is removed, the cap resiliently biasable towards the mating end during coupling of the complementary device for connection of the device to the cradle connector.

16. The connector of claim 15 wherein the cap has slots in an upper wall thereof for allowing passage of the contacts therethrough during depression thereof.

* * * * *